United States Patent
Bilik et al.

(10) Patent No.: US 10,527,713 B2
(45) Date of Patent: Jan. 7, 2020

(54) RADAR I-Q MISMATCHING MEASUREMENT AND CALIBRATION

(71) Applicant: GM GLOBAL TECHNOLOGY OPERATIONS LLC, Detroit, MI (US)

(72) Inventors: Igal Bilik, Rehovot (IL); Alexander Pokrass, Bat Yam (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 15/450,549

(22) Filed: Mar. 6, 2017

(65) Prior Publication Data

US 2018/0252798 A1   Sep. 6, 2018

(51) Int. Cl.
*G01S 7/40* (2006.01)
*G01S 13/93* (2006.01)

(52) U.S. Cl.
CPC .......... *G01S 7/4021* (2013.01); *G01S 13/931* (2013.01)

(58) Field of Classification Search
CPC .................................................... G01S 13/931
See application file for complete search history.

(56) References Cited

U.S. PATENT DOCUMENTS

| 2006/0022866 A1* | 2/2006 | Walton | G01S 7/352 342/194 |
| 2008/0068251 A1* | 3/2008 | Meinecke | G01S 13/34 342/112 |
| 2018/0156910 A1* | 6/2018 | Bharadwaj | G01S 13/4427 |

* cited by examiner

*Primary Examiner* — Peter M Bythrow
(74) *Attorney, Agent, or Firm* — Cantor Colburn LLP

(57) ABSTRACT

A method of calibrating a radar system of a vehicle is disclosed. A source signal is transmitted from a transmitter at a target at a selected location from the radar system. An echo signal is received as a reflection of the source signal from the target at an in-phase channel and quadrature channel of a receiver. A range space for the echo signal is obtained that includes a target peak corresponding to the target, wherein the range space includes a ghost peak for the target resulting from an IQ difference between the in-phase and quadrature channels. The IQ difference between the in-phase and quadrature channels is adjusted to reduce an amplitude of the ghost frequency peak.

19 Claims, 4 Drawing Sheets

RADAR I-Q MISMATCHING MEASUREMENT AND CALIBRATION

INTRODUCTION

The subject disclosure relates to radar systems used in vehicular tracking systems and, in particular, to a system and method for calibrating a phase relation between in-phase and quadrature channels of a radar system.

Vehicles can benefit from the use of radar systems which can locate an object or target in an environment of the vehicle and provide relevant parameters regarding an object, such as a range or location of the object, an angular location of the object, a relative velocity of the object, etc. Radar systems send source signals into a volume, with respect to the vehicle, and receive reflections of the source signals from any objects in the volume. Radar systems employ multipliers, such as balanced down converters, which convert the high-frequency radar signals to base-band frequencies. A balanced downconverter includes separate in-phase (I) and quadrature (Q) channels that have a phase relation of 90 degrees between them (i.e., are out of phase by 90 degrees). However, this phase relation needs to be maintained and the down-converting multiplication to the base-band frequencies needs to be the same for each channel. Variation of the phase relation or the multiplication for down-conversion can result in additional parasitic harmonic signals appearing in radar output, such as the appearance of ghost targets in the radar system, the masking of weak targets by strong targets, and errors in range and Doppler (velocity) measurements. Accordingly, it is desirable to provide a method of controlling a phase relation between I-channels and Q-channels in vehicular radar systems.

SUMMARY

In one exemplary embodiment, a method of calibrating a radar system is disclosed. The method includes transmitting a source signal, from a transmitter, at a target at a selected location from the radar system, and receiving an echo signal, as a reflection of the source signal from the target, at an in-phase channel and quadrature channel of a receiver. A range space is obtained for the echo signal that includes a target peak corresponding to the target, wherein the range space includes a ghost peak for the target resulting from an IQ difference between the in-phase and quadrature channels. The IQ difference between the in-phase and quadrature channels is adjusted to reduce an amplitude of the ghost frequency peak.

In an embodiment, a difference is estimated between an intensity of the target peak and an intensity of the ghost peak, and the IQ difference is adjusted to increase the difference in intensities. An IQ corrector circuit receives an in-phase reference signal along the in-phase channel and a quadrature reference signal along the quadrature channel from the transmitter. The IQ difference is adjusted at the IQ corrector circuit. In various embodiments, the IQ difference is at least one of: (i) a difference between a phase of the in-phase channel and the quadrature channel; and (ii) a difference between a gain of the in-phase channel and a gain of the quadrature channel. A range of the target may be within a maximum range of the radar system. In an embodiment, an in-phase component of the reflected signal is combined with the in-phase reference signal and a quadrature component of the reflected signal is combined with the quadrature reference signal.

In an embodiment, the method further includes determining one of a range and a Doppler frequency of an object using the calibrated radar system and providing the one of the range and the Doppler frequency to an autonomous driving system of a vehicle in order to provide a signal that the autonomous driving system may be used to maneuver the vehicle with respect to the target.

In another exemplary embodiment, a radar system is disclosed. The radar system includes a transmitter circuit that transmits a source signal having an in-phase component and quadrature component, a receiver circuit for receiving an echo signal that is a reflection of the source signal from a target, wherein the receiver circuit includes an in-phase channel and a quadrature channel, respectively, an IQ corrector circuit that provides an IQ difference between the in-phase channel and the quadrature channel, a digital signal processor for obtaining a range space for the echo signal that includes a target peak corresponding to the target, wherein the range space includes a ghost peak resulting from the IQ difference between the in-phase and quadrature channels, and a correction module that adjusts the IQ difference at the IQ corrector circuit to reduce an amplitude of the ghost peak.

The correction module estimates a difference in an intensity of the target peak and an intensity of the ghost peak, and adjusts the IQ difference to increase the difference in intensities. The IQ corrector circuit receives an in-phase reference signal from the transmitter circuit along an in-phase channel and a quadrature reference signal from the transmitter circuit along a quadrature channel. The IQ difference may be at least one of: (i) a difference between a phase of the in-phase channel and the quadrature channel; and (ii) a difference between a gain of the in-phase channel and a gain of the quadrature channel. In an embodiment, the selected location of the target is within a maximal range of the radar system.

In an embodiment, the digital signal processor provides at least one of a range and a Doppler frequency of an object using the calibrated radar system and providing the at least one of the range and the Doppler frequency to an autonomous driving system of a vehicle in order to provide a signal that the autonomous driving system may be used to maneuver the vehicle with respect to the target.

In yet another exemplary embodiment, a vehicle is disclosed. The vehicle includes a radar system. The radar system includes a transmitter circuit that transmits a source signal at a target at a selected location from the radar system, a receiver circuit for receiving a reflection of the source signal from the target, wherein the receiver circuit includes an in-phase channel and a quadrature channel, respectively, an IQ corrector circuit that provides an IQ difference between the in-phase channel and the quadrature channel, a digital signal processor for obtaining a range space for the echo signal that includes a target peak corresponding to the target, wherein the range space includes a ghost peak resulting from the IQ difference between the in-phase and quadrature channels, a correction module that adjusts the IQ difference at the IQ corrector circuit to reduce an amplitude of the ghost peak, and a driving system of the vehicle that maneuvers with respect to an object detected using the radar system, wherein the calibration of the radar system increases an accuracy of a radar signal obtained using the radar system.

The correction module estimates a difference in an intensity of the target peak and an intensity of the ghost peak, and adjusts the IQ difference to increase the difference in intensities. The IQ corrector circuit receives an in-phase reference signal from the transmitter circuit along an in-phase channel and a quadrature reference signal from the transmitter circuit along a quadrature channel. The IQ difference may be at least one of: (i) a difference between a phase of the in-phase channel and the quadrature channel; and (ii) a difference between a gain of the in-phase channel and a gain of the quadrature channel. In an embodiment, the selected location of the target is within a maximal range of the radar system.

In an embodiment, the digital signal processor provides at least one of a range and a Doppler frequency of an object using the calibrated radar system and providing the at least one of the range and the Doppler frequency to an autonomous driving system of a vehicle in order to provide a signal that the autonomous driving system may be used to maneuver the vehicle with respect to the target.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
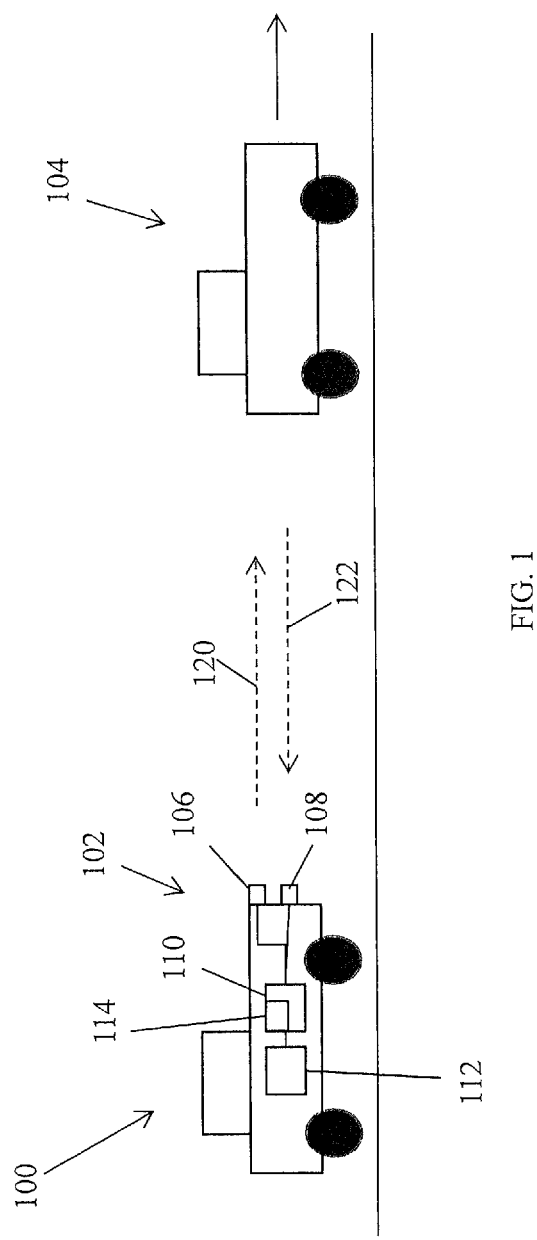
FIG. 1 shows a vehicle that includes a radar system suitable for determining a distance and/or a relative velocity of an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, FIG. 1 shows a vehicle 100, such as an automobile, that includes a radar system 102 suitable for determining a distance and/or a relative velocity of an object or target 104 with respect to the vehicle 100. The target 104 is shown as another vehicle in FIG. 1, but may be an object of interest to the driver of the vehicle 100, such as another vehicle, pedestrian, building, light post, etc. Additionally, the target 104 may be a moving object or stationary object. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 controls and operates the transmitter 106 to generate a radio frequency wave (a "source signal" 120). The control unit 110 includes a processor 114 for performing the methods disclosed herein. In an embodiment, the source signal 120 includes a linear frequency-modulated continuous wave (LFM-CW), often referred to as a chirp signal. Alternately, the source signal 120 may be a pulsed signal or a combination of pulsed and chirp signals. A reflection of the source signal 120 from the target 104 is referred to herein as an echo signal 122. The echo signal 122 is received at the receiver 108, which generally includes circuitry for sampling the echo signal 122. The control unit 110 performs calculations on the echo signal 122 in order to determine distance and/or a relative velocity of the target 104 with respect to the vehicle 100. Knowledge of the distance and/or relative velocity of the target 104 with respect to the vehicle 100 may then be used to maneuver the vehicle 100 by, for example, accelerating or decelerating the vehicle 100 or steering the vehicle in order to avoid the target 104. In an embodiment, the control unit 110 determines distance and/or velocity of the target 104 and may cooperate with a collision-avoidance system 112 to control steering and acceleration/deceleration components to perform maneuvers at the vehicle 100 to avoid the target 104. In another embodiment, the control unit 110 provides a signal to alert a driver of the vehicle 100 so that the driver may take suitable action to avoid the target 104.

Figure 2:
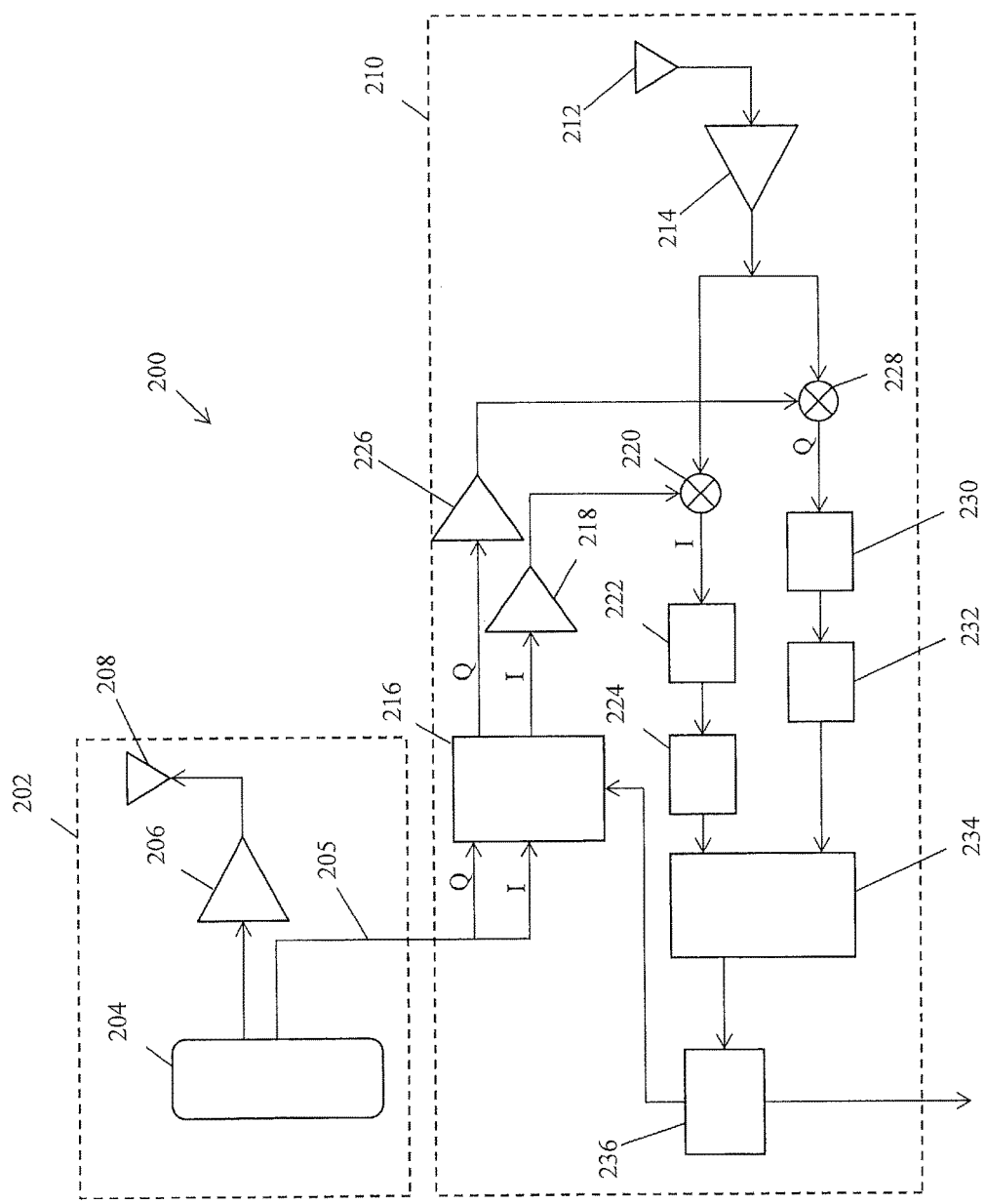
FIG. 2 shows an exemplary circuitry of a radar system in an embodiment.

FIG. 2 shows an exemplary circuitry 200 of a radar system in an embodiment. The circuitry 200 includes a transmitter circuit 202 and a receiver circuit 210. The transmitter circuit 202 includes a transmitter modulator 204, frequency multiplier 206 and transmitter antenna 208. The transmitter modulator 204 provides a fundamental electrical signal at a fundamental frequency for production of a source signal. In an embodiment, the fundamental frequency is about 20 Gigahertz (Ghz). The fundamental signal passes through the frequency multiplier 206 before being transmitted as a source signal at transmitter antenna 208.

The receiver circuit 210 includes electronic components for receiving an echo signal relating to the source signal and calculating an output that provides location and velocity parameters with respect to an object. The receiver circuit 210 includes an IQ corrector 216 that receives a reference signal 205 from the transmitter modulator 204 of the transmitter circuit 202 at the fundamental frequency of the fundamental signal. The reference signal 205 includes an in-phase reference component (I) and a quadrature reference component (Q). The in-phase reference component is received at the IQ corrector 216 along an in-phase channel and the quadrature reference component is received at the IQ corrector 216 along a quadrature channel. The IQ corrector 216 provides a phase shift between the in-phase reference component and the quadrature reference component so that there is a 90 degree phase difference between them. The in-phase reference component is sent from the IQ corrector 216 to frequency multiplier 218 which performs a frequency multiplication on the in-phase reference signal. The frequency-multiplied in-phase signal is sent from frequency multiplier 218 to mixer 220. The quadrature reference component is sent from IQ corrector 216 to frequency multiplier 226 which performs a frequency multiplication on the quadrature reference signal. The frequency-multiplied quadrature signal is sent from frequency multiplier 226 to mixer 228. Ideally, the frequency multipliers 206, 218 and 226 all multiply the fundamental frequency by a same amount.

The receiver circuit 210 also includes a receiver antenna 212 that receives a reflection of the source signal in the form of an echo signal and generates an electrical signal in response. The electrical signal is passed through a low noise amplifier (LNA) 214. An in-phase component of the received electrical signal is sent to mixer 220 and a quadrature component of the received electrical signal is sent to mixer 228.

Mixer 220 combines the in-phase reference component with the in-phase component of the received echo signal to generate a combined in-phase component. Mixer 228 combines the quadrature reference component with the quadrature component of the received echo signal to generate a combined quadrature component. The combined in-phase component passes through low-pass filter 222 for noise reduction and through analog-digital converter 224 which converts the combined in-phase component to an in-phase digital signal. The combined quadrature component passes through low-pass filter 230 for noise reduction and through analog-digital converter 232 which converts the combined quadrature component to a quadrature digital signal. The in-phase digital signal and the quadrature digital signal are input to digital signal processor (DSP) 234.

The DSP 234 transforms the digital signals into k-space. In one embodiment, the DSP 24 performs a Fast Fourier Transform (FFT) on the digital signal to obtain a discrete frequency spectrum representative of the target. The DSP 234 performs the FFT on the in-phase digital signal and the quadrature digital signal. The FFT produces a spectrum in k-space. The spectrum includes peaks at frequencies that coincide with a parameter of the object, such as a range of the object. The peaks may be converted into a range space to produce peaks in range space that indicate a range or location of the target with respect to the vehicle.

Figure 3:
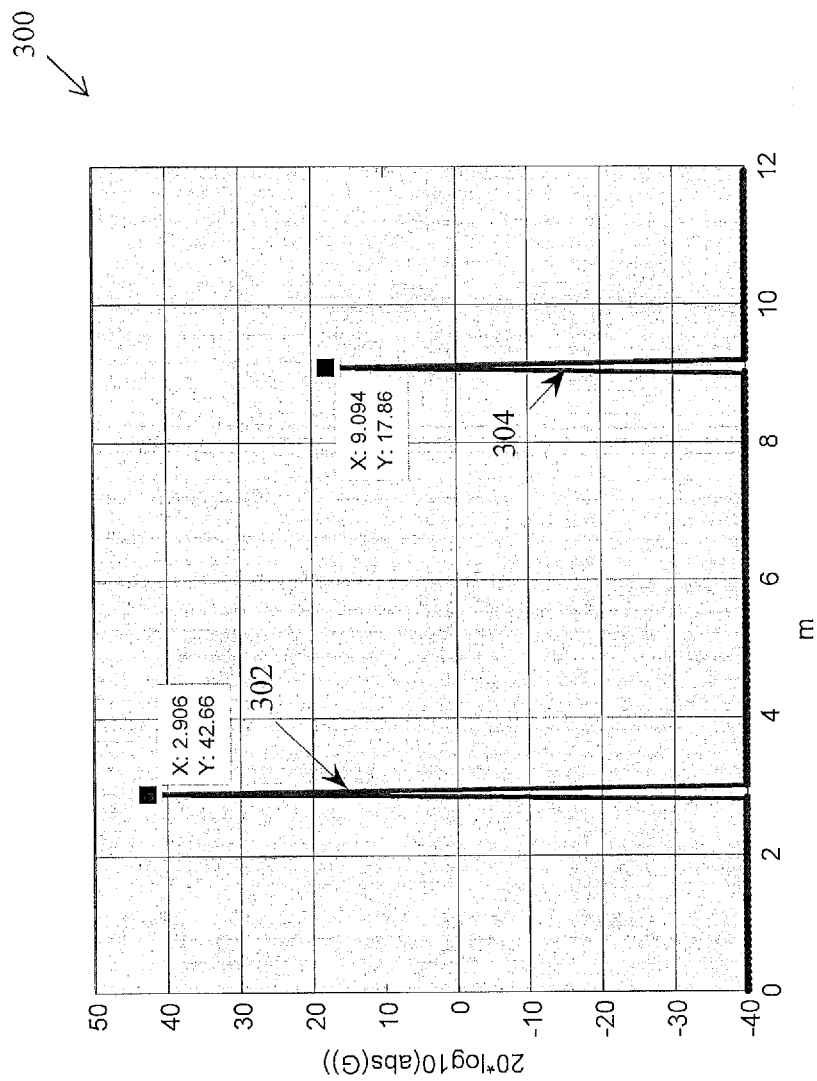
FIG. 3 shows an exemplary range space produced by a digital signal processor of the radar system in an embodiment.

FIG. 3 shows an exemplary range space 300 produced by the DSP 234 in an embodiment. Range is shown along the abscissa and signal intensity is shown along the ordinate. In an embodiment, a maximum range of the exemplary range space 300 is 12 meters. The range space 300 includes a peak 302 at 2.906 meters indicating the range of the target. The range space 300 also includes a false peak or ghost peak 304 that appears in the range space 300 as a result of an IQ difference between the I- and Q-channels, which may be a difference in gain between the I-channel and the Q-channel or a difference a phase relation between the I-channel and the Q-channel (i.e., as a result of the phase relation not being at 90 degrees). The range of the ghost peak 304 may be determined by subtracting the range of the target from the maximum range. Therefore for the exemplary range space 300, the range of the ghost peak is at 9.094 meters. The intensity of the target is at 42.66 decibels and the intensity of the ghost is at 17.86 decibels.

The radar system is calibrated by reducing the intensity of the ghost peak 304. In an embodiment, a difference is calculated between the intensity of the target peak 302 and the intensity of the ghost peak 304. The IQ difference between the I-channel and Q-channel at the IQ corrector 216 is then adjusted in order to reduce the difference between the intensities. Referring again to FIG. 2, DSP IQ correction module 236 provides an adjustment signal to the IQ corrector 216 in order to adjust the IQ difference at the IQ corrector 216. The DSP IQ correction module 236 observes the effect of the phase difference on the difference between target and ghost intensities and provides a signal to adjust the IQ difference at the IQ corrector 216 in order to increase the difference between peak intensities. The DSP IQ correction module 236 may perform an iterative correction process in order to find a minimal or substantially minimal peak intensity for the ghost peak 304.

Figure 4:
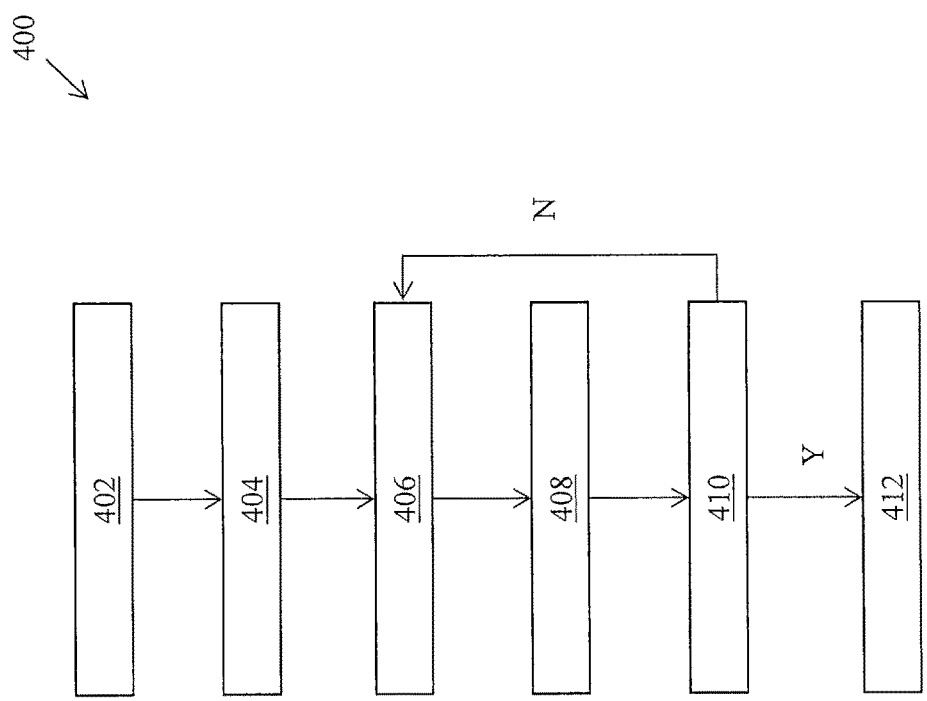
FIG. 4 shows a flowchart illustrating a method of calibrating an in-phase and quadrature channel of the radar system according to an embodiment.

FIG. 4 shows a flowchart 400 illustrating a method of calibrating an in-phase and quadrature channel of the radar system according to an embodiment. In box 402, an echo signal is received from target using the radar system. In box 404, target peak is determined in range space using the echo signal, wherein producing the target peak also introduces a ghost peak in range space. In box 406, a difference is calculated between the intensity of the target peak and the intensity of the ghost peak. In box 408, an IQ difference between the in-phase and quadrature channels is adjusted in order to change the difference between peak intensities. In box 410, the effect of the change in the IQ difference on the difference in peak intensities is determined. If changing the IQ difference reduces the difference in peak intensities, the change may be reversed. If changing the IQ difference increases the difference in peak intensities (i.e., reduces the intensity of the ghost signal), the change may be accepted. This process may be iterated until the difference in peak intensities reaches a maximum, or alternatively until the intensity of the ghost signal reaches a minimum. If a maximum in the difference in intensities has not been found the method proceeds back to box 406. Otherwise, if a suitable maximum has been found, the method proceeds to box 412 to complete the calibration process.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of calibrating a radar system, comprising:
generating a reference signal related to a source signal transmitted, from a transmitter, the reference signal having an in-phase reference component and a quadrature reference component;
receiving an echo signal as a reflection of the source signal from a target at a selected location, the echo signal having an in-phase echo component and a quadrature echo component;
combining the in-phase reference signal with the in-phrase echo signal at an in-phase channel of the receiver;
combining the quadrature reference signal with the quadrature echo signal at a quadrature channel of the receiver;
obtaining a range space for the echo signal that includes a target peak corresponding to the target, wherein the range space includes a ghost peak for the target resulting from an IQ difference between the in-phase channel and the quadrature channel; and
adjusting the IQ difference between the in-phase reference signal and the quadrature reference signal to reduce an amplitude of the ghost frequency peak.

2. The method of claim 1, further comprising estimating a difference in an intensity of the target peak and an intensity of the ghost peak, and adjusting the IQ difference to increase the difference in intensities.

3. The method of claim 1, wherein an IQ corrector circuit receives the in-phase reference signal and the quadrature reference signal and provides the IQ difference between the in-phase reference signal and the quadrature reference signal.

4. The method of claim 3, further comprising adjusting the IQ difference at the IQ corrector circuit.

5. The method of claim 1, wherein the IQ difference is at least one of: (i) a difference between a phase of the in-phase channel and the quadrature channel; and (ii) a difference between a gain of the in-phase channel and a gain of the quadrature channel.

6. The method of claim 1, wherein a range of the target is within a maximum range of the radar system.

7. The method of claim 1, further comprising determining one of a range and a Doppler frequency of an object using the calibrated radar system and providing the one of the range and the Doppler frequency to an autonomous driving system of a vehicle in order to provide a signal that the autonomous driving system uses to maneuver the vehicle with respect to the target.

8. A radar system, comprising:
a transmitter circuit that transmits a source signal and a related reference signal, the reference signal having an in-phase reference component and a quadrature reference component;
a receiver circuit for receiving an echo signal that is a reflection of the source signal from a target, wherein the receiver circuit receives an in-phase echo component of the echo signal at an in-phase channel and a quadrature echo component of the echo signal at a quadrature channel;
an IQ corrector circuit that provides an IQ difference between the in-phase reference signal and the quadrature reference signal;
a digital signal processor for obtaining a range space for the echo signal that includes a target peak corresponding to the target, wherein the range space includes a ghost peak resulting from the IQ difference between the in-phase and quadrature channels; and
a correction module that adjusts the IQ difference between the in-phase reference signal and the quadrature reference signal at the IQ corrector circuit to reduce an amplitude of the ghost peak.

9. The radar system of claim 8, wherein the correction module further estimates a difference in an intensity of the target peak and an intensity of the ghost peak, and adjusts the IQ difference to increase the difference in intensities.

10. The radar system of claim 8, wherein the IQ corrector circuit receives the in-phase reference signal and the quadrature reference signal from the transmitter circuit.

11. The radar system of claim 8, wherein the IQ difference is at least one of: (i) a difference between a phase of the in-phase channel and the quadrature channel; and (ii) a difference between a gain of the in-phase channel and a gain of the quadrature channel.

12. The radar system of claim 8, wherein the selected location of the target is within a maximal range of the radar system.

13. The radar system of claim 8, wherein the digital signal processor provides at least one of a range and a Doppler frequency of an object using the calibrated radar system and providing the at least one of the range and the Doppler frequency to an autonomous driving system of a vehicle in order to provide a signal that the autonomous driving system uses to maneuver the vehicle with respect to the target.

14. A vehicle, comprising:
a radar system including:
a transmitter circuit that transmits a source signal and a related reference signal, the reference signal having an in-phase reference component and a quadrature reference component;
a receiver circuit for receiving a reflection of the source signal from the target, wherein the receiver circuit receives an in-phase echo component of the echo signal at an in-phase channel and a quadrature echo component of the echo signal at a quadrature channel,
an IQ corrector circuit that provides an IQ difference between the in-phase reference signal and the quadrature reference signal,
a digital signal processor for obtaining a range space for the echo signal that includes a target peak corresponding to the target, wherein the range space includes a ghost peak resulting from the IQ difference between the in-phase and quadrature channels,
a correction module that adjusts the IQ difference between the in-phase reference signal and the quadrature reference signal at the IQ corrector circuit to reduce an amplitude of the ghost peak, and
a driving system of the vehicle that maneuvers with respect to an object detected using the radar system, wherein the calibration of the radar system increases an accuracy of a radar signal obtained using the radar system.

15. The vehicle of claim 14, wherein the correction module further estimates a difference in an intensity of the target peak and an intensity of the ghost peak, and adjusts the IQ difference to increase the difference in intensities.

16. The vehicle of claim 14, wherein the IQ corrector circuit receives the in-phase reference signal and the quadrature reference signal from the transmitter circuit.

17. The vehicle of claim 14, wherein the IQ difference is at least one of: (i) a difference between a phase of the in-phase channel and the quadrature channel; and (ii) a difference between a gain of the in-phase channel and a gain of the quadrature channel.

18. The vehicle of claim 14, wherein the selected location of the target is within a maximal range of the radar system.

19. The vehicle of claim 14, wherein the digital signal processor provides at least one of a range and a Doppler frequency of an object using the calibrated radar system and providing the at least one of the range and the Doppler frequency to an autonomous driving system of a vehicle in order to provide a signal that the autonomous driving system uses to maneuver the vehicle with respect to the target.

* * * * *